Nov. 22, 1960     R. G. GOLDMAN     2,961,608

HIGH VOLTAGE SAWTOOTH WAVE GENERATOR

Filed June 20, 1956

CONTROL GRID V40    60V.

SCREEN GRID V40    11V.

ANODE V40    11V.

CONTROL GRID V53    3.6V.

SCREEN GRID V53    28V.

OUTPUT TERMINALS 56    835V.    500μs   100μs

INVENTOR.
Richard G. Goldman
BY
*Smith, Olsen Baird & Miller*
Attys.

United States Patent Office 2,961,608
Patented Nov. 22, 1960

---

2,961,608

HIGH VOLTAGE SAWTOOTH WAVE GENERATOR

Richard G. Goldman, Schenectady, N.Y., assignor to General Electric Company, a corporation of New York Filed June 20, 1956, Ser. No. 592,667

3 Claims. (Cl. 328—35)

The present invention relates to high voltage sawtooth wave generators and particularly to sawtooth wave generators capable of providing sweep voltages for cathode ray tubes.

In many oscillograph uses, and particularly in the ultrasonic testing uses thereof, the need for brighter and larger cathode ray tube displays has been long recognized. Brighter traces require higher accelerating voltage and as a result, higher sweep voltages; also larger cathode ray tube screen displays require proportionally higher sweep voltages. Accordingly, the problem of generating sweep voltages of high peak amplitudes has become of particular current importance.

In the presently conventional sweep generators the peak amplitude of the sweep voltage for a reasonably linear sweep is limited to approximately 80% of the sweep circuit supply voltage, so that to generate a high amplitude sweep voltage a correspondingly higher sweep circuit supply source is required. Any moderate increase in the power capacity of conventional sweep circuit supply sources generally requires the use of more expensive components therein, whereby the cost of the supply sources is greatly increased; additionally any increase in the power capacity generally results in a larger and heavier supply source which when incorporated in oscillograph test equipment often restricts the test equipment to stationary uses.

Accordingly, it is a general object of the present invention to provide an improved sawtooth wave generator utilizing a compact low voltage source to develop a high voltage output.

A more specific object of the invention is to provide an improved high voltage sawtooth wave generator of which the peak amplitude of the output voltage is many times greater than the voltage of the supply source, of which the output voltage increases linearly and is suitable for use as a cathode ray tube sweep voltage, and in which the recovery-time of the sawtooth wave output voltage is relatively short as compared to the rise-time thereof.

A further object of the invention is to provide an improved sweep generator whereof the peak output voltage is many times greater than the supply voltage thereto and whereof the flyback time is relatively short as compared with the sweep time thereof and the time delay between sweep cycles is substantially zero.

A more specific object of the invention is to provide an improved triggered sweep generator circuit including an electron discharge device having a control circuit for controlling the conductive state thereof and a load circuit responsive to changes in the conductive state thereof, wherein the load circuit includes an inductive reactance responsive to changes in the conductive state of the electron discharge device for generating output voltages substantially greater than the supply voltages thereto and having a capacitive coupling arrangement between the load circuit and the control circuit for preventing any abrupt change in the conductive state of the electron discharge device, whereby a high peak output voltage is generated at a controlled and substantially linear rate.

Further features of the invention pertain to the particular arrangement of the circuit elements of the sweep generator circuit, whereby the above-outlined and additional operating features thereof are attained.

The invention, both as to its organization and method of operation, together with further objects and advantages thereof, will be best understood by reference to the following specification taken in conjunction with the accompanying drawing, in which.

Figure 1:
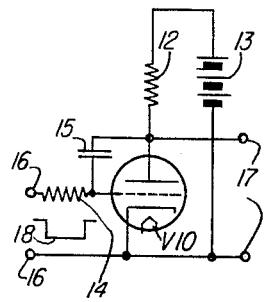
Figure 1 is a schematic diagram of a sweep generator circuit of conventional form.

Referring now to Fig. 1 of the drawing, the sweep generator circuit there illustrated is of conventional connection and arrangement and comprises a vacuum tube V10, represented as a triode, a load resistor 12 connected in series with a D.-C. supply source 13 between the anode and the cathode of the tube V10, a grid resistor 14 connected between the control grid and one of the pair of input terminals 16, and a feedback capacitor 15 connected between the control grid and the anode of the tube V10.

In the quiescent state, the vacuum tube V10 is biased full conductive by a positive potential applied to a pair of input terminals 16 connected from the grid to the cathode through the resistor 14. Accordingly, the potential across a pair of output terminals 17 connected respectively to the anode and to the cathode of the tube V10 is relatively low and is determined by the current flow through the tube V10 and the anode resistance thereof. Thereafter, when a negative going signal, such as a square wave voltage 18, is applied to the pair of input terminals 16, the tube V10 tends to be rendered nonconductive, so that the current flow in the anode-cathode path through the load resistor 12 tends to decrease, thereby tending to increase the potential of the anode of the tube V10; and, accordingly, to increase the potential across the pair of output terminals 17. However, the capacitor 15 which is charged to a relatively low potential at this time initially tends to maintain the charged potential difference between the voltages on the anode and the control grid, and then begins to charge through the resistor 12 and the resistor 14, so that as the anode voltage increases, the grid voltage decreases toward the peak voltage of the negative going input signal at a rate determined by the change in the anode voltage and the charge rate of the capacitor 15 through the resistor 12 and the resistor 14. Accordingly, the output voltage across the output terminals 17 increases gradually from a low potential, as determined essentially by the anode current flow and the anode resistance of the tube V10, to the potential of the D.-C. source 13.

From the foregoing it is apparent that the output voltage wave form of a conventional sawtooth generator, such as that illustrated in Fig. 1, is a "run-up" voltage having a peak amplitude which is less than the potential of the D.-C. supply source and which amplitude corresponds specifically to the difference between the potential of the D.-C. source 13 and the potential drop across the anode-cathode of the tube V10, as determined by the maximum current flow therethrough and the anode resistance thereof.

Figure 2:
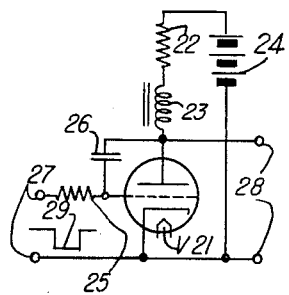
Fig. 2 is a schematic diagram of a sweep generator circuit embodying the present invention.

Referring now to Fig. 2, the sweep generator circuit there illustrated, and embodying the features of the present invention, comprises a sawtooth wave generator developing in operation an output voltage of a peak amplitude many times greater than the potential of the supply source therefor. The circuit illustrated therein includes a vacuum tube V21, represented as a triode, having a load resistor 22 and a choke coil 23 connected in series with a D.-C. supply source 24 between the anode and the cathode thereof, a grid resistor 25 connected between the grid electrode and one of the pair of input terminals 27, and a feedback capacitor 26 connected between the grid electrode and the anode of the tube V21. In the quiescent state, the vacuum tube V21 is biased full conductive by a control bias source of low internal impedance applied through the resistor 25 at a pair of terminals 27. Accordingly, a large current flows through the resistor 22 and the choke coil 23 in the anode circuit, whereby the potential at the anode of the tube V21; and, accordingly, the potential across a pair of output terminals 28 connected respectively to the anode and to the cathode of the tube V21, is relatively low and is determined by the current flow through the tube V21 and the anode resistance thereof. Also, in the quiescent state, the capacitor 26 is charged to the potential corresponding to the difference in voltage between the anode and the control grid of the tube V21. Thereafter, when a negative going signal, such as a square wave voltage 29, is applied across the terminals 27 from a source of comparatively high internal impedance, the tube V21 tends to become nonconductive; this action is restrained due to the negative feedback through a capacitor 26 connected between the anode and control grid of the tube V21.

Specifically, responsive to the negative going signal 29 the tube V21 tends to be instantaneously biased nonconductive, so that the anode current tends to cut-off whereby the potential thereof tends normally to rise to that of the D.-C. supply source 24. At the same time and responsive to the change in the anode current a large voltage is generated between the terminals of the winding of the choke coil 23 which is applied to the anode and tends further to increase the potential thereof beyond the normally expected rise. Any increase in potential at the anode instantaneously is transferred via the capacitor 26 to the control grid, thereby tending to overcome the nonconductive biasing voltage applied to the control grid; at the same time and due to the substantially discharged state thereof the capacitor 26 begins to charge to a new potential as determined by the voltage difference between the anode and the control grid, so that the voltage on the control grid changes gradually from the conductive biasing voltage toward the nonconductive biasing voltage and the tube V21 is gradually switched from its full conductive state towards its nonconductive state.

Recapitulating, responsive to the nonconductive bias voltage applied across the terminals 27, the anode current of the tube V21 drawn through the choke coil 23 is diminished and the potential at the anode begins to rise towards a final potential which is the sum of the potential of the D.-C. supply source 24 and the potential induced across the terminals of the choke coil 23 due to the gradually diminishing current flow therethrough. Due to the substantially discharged state of the capacitor 26 negative feedback takes place between the anode and control grid of the tube V21, thereby causing the change therein from the conductive to the nonconductive state to proceed gradually.

It has been observed in practice that in a circuit of the type as disclosed in Fig. 2, the output voltage wave generated across the output terminals 28 conforms to the shape of a sawtooth, whereof the voltage rises from a quiescent voltage and at a linear rate during the period of the negative going control signal to a peak voltage of an amplitude that is a multiple of the supply voltage; and at the end of the control signal the generated output voltage restores from the peak voltage at a substantially linear rate to the quiescent voltage during an interval which is but a fraction of the "rise time" thereof. This high voltage sawtooth wave configuration is generated when a balance is achieved between the anode current-grid bias characteristic of the tube V21, the inductive reactance of the choke coil 23, and the capacitive reactance of the feed-back capacitor 26. Specifically, the tube V21 and the quiescent state grid bias voltage thereof are chosen so that normally the tube is at full conduction and drawing a heavy plate current through the resistance 22 and the choke coil 23. Also, the inductance of the choke coil 23 is chosen to be of a sufficiently high value so that in response to small changes in the current flow therethrough a large voltage is induced across the output terminals thereof. Additionally, the value of the resistor 22 is chosen so that a large current flows therethrough and the gain of the circuit is maximum when the circuit is operating in its quiescent state. Further, the capacitance of the capacitor 26 is chosen with regard to the reactance of the choke coil 23 and with regard to the rate at which the anode current decreases when the cutoff voltage is applied to the control grid, so that the rate of the voltage rise at the output terminals 28 occurs at a rate not greater than the rate of the voltage rise across the windings of the choke coil 23. The resistance of the resistor 25 is chosen to be low in order to provide a low impedance discharge path for the capacitor 26 so that at the end of the cutoff biasing control signal the charged capacitor 26 is quickly discharged through the anode-cathode conduction path of the tube V21 and through the resistor 25.

Considering now a complete cycle of operation for the circuit of Fig. 2, in the quiescent state a large current is drawn at the anode of the tube V21 through the resistor 22 and the choke coil 23 so that the voltage across the output terminals 28 is small and is determined primarily by the internal resistance of the tube V21 and the current flow therethrough and the capacitor 26 is charged to a first potential level as determined by the difference in the voltage on the anode and the voltage on the control grid of the tube V21. Thereafter when the cut-off voltage is applied across the terminals 27 to the tube V21, the current drawn at the anode thereof is diminished so that the current flow through the choke coil 23 tends to decrease; however, in response to the change in the current flow through the choke coil 23 and due to the large inductance chosen for the choke coil 23 a large voltage is generated across the terminals thereof and applied to the anode of the tube V21, whereby the voltage across the output terminals 28 tends to rise rather abruptly. At the same time and due to the sudden increase in the voltage on the anode and due to the negative feedback connection between the anode and the control grid via the capacitor 26, the voltage on the control grid is increased proportionately to a potential intermediate the full conduction biasing potential and the cut-off biasing potential, so that the change in the tube V21 from full conduction towards nonconduction is gradual. As the capacitor 26 charges, the control grid of the tube V21 is driven slowly from the intermediate potential towards the cut-off potential, so that the anode current is decreased gradually and the large current flow through the choke coil 23 is decreased proportionately, whereby the voltage across the output terminals 28 is increased linearly during the period that the cut-off voltage is applied across the input terminals 27 and until the full conduction biasing voltage is applied thereacross. Because of the large idling current flowing through the choke coil 23 during the quiescent state and the large inductive reactance, thereof, the small change in the current flow through the choke coil 23 at this time causes the potential appearing across the output terminals 28 to increase rapidly beyond the potential of the D.-C. supply source 24 to a peak potential many times greater than the latter.

In response to the reapplication of the full conductive biasing voltage across the terminals 27 the circuit attempts to return to its quiescent state so that the anode current tends to increase; and, accordingly, the current flow through the resistor 22 and the choke coil 23 tends to increase proportionately whereby the voltage at the anode tends to decrease. The charged capacitor 26 discharges through the anode-cathode path of the tube V21 and also discharges through the resistor 25 to ground potential so that the discharge rate of the capacitor 26 is relatively fast as compared to the charging rate thereof; whereby the rate at which the conductive state of the tube V21 changes at this time, as compared to the rate at which the conductive state of the tube V21 changed during the previous period, is very high so that the circuit restores to the quiescent state very quickly. In this manner an output voltage is developed in the circuit which is many times greater than the supply voltage thereto, and the quiescent current flow in the circuit is easily restored, so that the circuit is quickly recovered to its quiescent state.

Figure 3:
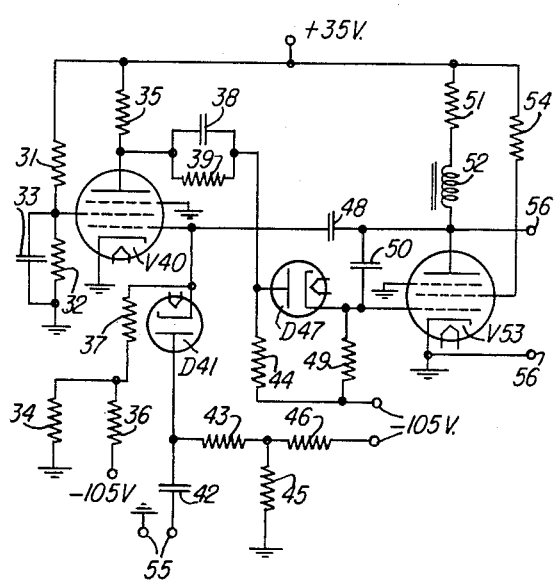
Fig. 3 is a schematic diagram of an exemplary embodiment of the sweep generator circuit of Fig. 2, including an input circuit therefor.

One embodiment of the invention which has been reduced to practice and whereof the peak output voltage is more than 20 times the anode supply voltage is illustrated in Fig. 3, and the voltage wave forms appearing at the various junctions therein during one operational cycle thereof are shown in Figs. 4A to 4F, inclusive. Referring specifically to Fig. 3, the circuit thereof includes a control pentode V40, an input diode D41, a control diode D47 and a sawtooth generator pentode V53. Additionally the circuit includes a choke coil 52 wound on an iron core, a pair of input terminals 55 and a pair of output terminals 56.

Figure 4A:
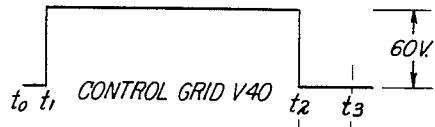
Figs. 4A to 4F, inclusive, illustrate voltages occurring at various points in the circuit of Fig. 3, during one cycle of operation thereof.
Figure 4B:
Figure 4C:
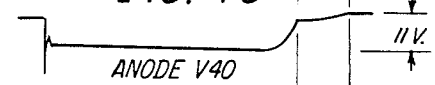
Figure 4D:
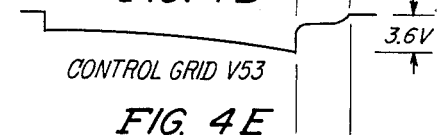
Figure 4E:
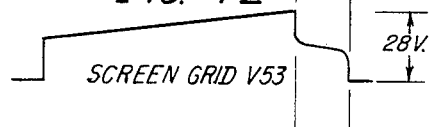

Considering the operation of this circuit, in its quiescent state, at the time $t_0$, the pentode V40 is biased nonconductive at the control grid from —105 volts via two series connected resistors 36 and 37, and the pentode V53 is biased conductive at the control grid thereof by a current flow from +35 volts via three series connected resistors 35, 39 and 44 and the diode D47 and a resistor 49 to —105 volts, wherein the control grid of the pentode V53 is connected to the junction between the resistor 49 and the cathode of the diode D47. At a time $t_1$ thereafter, when a positive going control signal is applied to the input terminals 55 and via the diode D41 to the control grid of the pentode V40, the pentode V40 is rendered conductive so that the anode thereof draws a large current through the resistor 35 and the potential at the anode decreases by approximately 11 volts as shown in Fig. 4C. At the same time the voltage on the screen-grid electrode of the pentode V40 connected to the junction between the resistors 31 and 32 and the capacitor 33 changes as shown in Fig. 4B. The decrease in the potential at the anode is transmitted via the parallel connected capacitor 38 and resistor 39 and the diode D47 and the associated biasing resistors 44 and 49 to the control grid of the pentode V53, whereby the control grid voltage at the time $t_1$ decreases as shown in Fig. 4D. This change in the control grid voltage of the pentrode V53 affects the current flow in the pentode V53 so that the voltage of the screen-grid electrode thereof changes as shown in Fig. 4E, whereby the current drawn through the anode load resistor 51 and the choke coil 52 to the anode tends to decrease and the potential at the anode begins to increase in a manner as shown on Fig. 4F. At the same time and due to the increase in the potential at the anode of the pentode V53 the control grid potential is restrained from moving too abruptly in the negative direction by action of the capacitor 50; also the capacitor 50 starts to charge towards the potential difference existing between the control grid and the anode of the pentode V53. Accordingly, a negative feedback action takes place between the anode and the control grid of the pentode V53, whereby the pentode V53 gradually is rendered less conductive and the anode current thereof is gradually diminished.

Figure 4F:
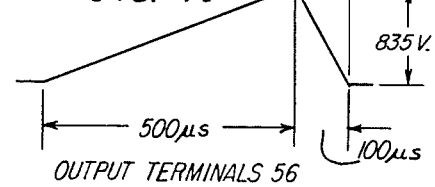

However, as previously mentioned, the change in the choke coil current is progressive and of sufficient magnitude considering the large inductance value of the choke coil 52 so as to develop a voltage across the terminals thereof, during the time interval $t_1$ to $t_2$, that is greater by an order of 20 over the anode supply voltage; which voltage, illustrated in Fig. 4F, appears across the pair of output terminals 56 connected respectively to the anode and to the grounded cathode of the pentode V53.

Except for the change in the voltage across the output terminals 56, the changes in the operating conditions of the components involved in the circuit are relatively slight. This action progresses during the time interval $t_1$ to $t_2$, here measured as 500 microseconds, so that at the time $t_2$ the potential across the output terminals 56 is increased by an amount of approximately 835 volts and the capacitor 50 is charged to approximately the same potential.

Also during the time interval from $t_1$ to $t_2$, the capacitor 33 associated with the screen-grid electrode of the pentode V40 charges so that near the end of the interval the screen-grid electrode tends to cut-off the pentode V40 and increase the potential at the anode thereof as shown in Figs. 4B and 4C, respectively. At the time $t_2$, when the regenerative action induced by the positive control signal ceases, the control pentode V40 is again biased nonconductive and during the interval from $t_2$ to $t_3$, here measured as 100 microseconds, the pentode V40 is rendered completely nonconductive. Also during the interval from $t_2$ to $t_3$, the anode voltage of the pentode V40 increases to its quiescent voltage and the contorl grid of the pentode V53 tends to follow and increase the voltage thereon to full conduction biasing. Accordingly, the anode of the pentode V53 tends to draw more current through the resistor 51 and the choke coil 52 thereby tending to decrease the voltage at the plate electrode. As the capacitor 50 is charged to a high level any decrease in the voltage at the anode of the pentode V53 produces a corresponding decrease in the potential on the control grid of the pentode V53 except as compensated by any decrease in the charge thereon. The charge on the capictor 50 is reduced in part by the increase in current drawn by the anode of the pentode V53 to which current flow the capacitor 50 contributes. However, a greater portion of the discharge current flow for the capacitor 50 is in a low impedance path extending from +35 volts via the resistor 35, the capacitor 38 and the resistor 39, and the diode D47 to the capacitor 50 so that within the comparatively short time interval from $t_2$ to $t_3$, here represented as 100 microseconds, the capacitor 50 is substantially discharged, the pentode V53 is restored to its full conductive state, and the current flow through the coil of the choke 52 is restored to its quiescent state. Thus the sawtooth wave generator circuit is restored to its quiescent state in an interval corresponding to approximately one-fifth of the rise-time interval thereof and is prepared again to respond to a new control signal applied to the input terminals 55. By proper choice of circuit constants this restoration period may be reduced to less than 2 microseconds.

Though any number of possible values may be assigned to the circuit components employed in the sawtooth wave generator circuit of Fig. 3, the values employed in the embodiment thereof reduced to practice and responding in accordance with the wave forms shown in Figs. 4A to 4F, inclusive, are as follows:

| | |
|---|---|
| 31—27,000 ohms | 43—.47 megohm |
| 32—47,000 ohms | 44—1 megohm |
| 33—.015 microfarad | 45—.1 megohm |
| 34—1 megohm | 46—1 megohm |
| 35—22,000 ohms | D47—½ 6AL5 |
| 36—82,000 ohms | 48—91 micromicrofarads |
| 37—.47 megohms | 49—1 megohm |
| 38—.01 microfarad | 50—43 micromicrofarads |
| 39—47,000 ohms | 51—10 000 ohms |
| V40—6CL6 | 52—120 henrys |
| D41—½ 6AL5 | V53—6CL6 |
| 42—.01 microfarad | 54—27,000 ohms |

In view of the foregoing, it is apparent that there has been provided a sweep generator circuit of improved connection and arrangement so that it has a run-up characteristic productive of a high voltage sweep potential that is at least several times the voltage of the power source connected thereto.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A high voltage sawtooth wave generator comprising an electron discharge device having a control member to control the current flow therethrough, a power source, a load including a choke coil and a resistance connected in series, means connecting said electron discharge device and power source and load in series circuit with said choke coil disposed between said resistance and said electron discharge device, a source of idling potential for said control member sufficient to cause said electron discharge device to conduct heavily through said choke coil when connected thereto, a source of potential for said control member sufficient to interrupt conduction of said electron discharge device when connected thereto, means degeneratively to feed back at least a portion of the potential across said electron discharge device to said control member, and means alternatively to connect said control member to said source of idling potential to establish a steady state flow of current through said electron discharge device and said choke coil and to establish a substantial field about said choke coil and thereafter to connect said control member to said source of interrupting potential to tend to interrupt the flow of current through said choke coil to cause the collapse of the field associated therewith to generate a linear output sawtooth voltage wave form therefrom at the junction of said load and said electron discharge device, said choke coil having a high inductance such that the idling current-inductance product is sufficiently large that upon application of said source of interrupting potential to said control member a high feedback voltage is developed across said choke coil which increases substantially linearly from a first potential that is only a fraction of the voltage of said power source towards a second potential that is many times the voltage of said power source, whereby to produce an output that is many times the voltage of said power source.

2. A high voltage sawtooth wave generator comprising an electron discharge device having a control member to control the current flow therethrough, a power source, a load including a choke coil and a resistance connected in series, means connecting said electron discharge device and power source and load in series circuit with said choke coil disposed between said resistance and said electron discharge device, a source of idling potential for said control member sufficient to cause said electron discharge device to conduct heavily through said choke coil when connected thereto, a source of potential for said control member sufficient to interrupt conduction of said electron discharge device when connected thereto, a capacitor connected degeneratively to feed back at least a portion of the potential across said electron discharge device to said control member, the size of said load resistance being such that the gain of the circuit is maximum when said idling potential is applied, and means alternately to connect said control member to said source of idling potential to establish a steady state flow of current through said electron discharge device and said choke coil and to establish a substantial field about said choke coil and thereafter to connect said control member to said source of interrupting potential to tend to interrupt the flow of current through said choke coil to cause the collapse of the field associated therewith to generate a linear output sawtooth voltage wave form therefrom at the connection between said electron discharge device and said choke coil, said choke coil having a high inductance such that the idling current-inductance product is sufficiently large that upon application of said source of interrupting potential to said control member a high feedback voltage is developed across said choke coil which increases substantially linearly from a first potential that is only a fraction of the voltage of said power source towards a second potential that is many times the voltage of said power source, the reactance of said choke coil and the capacitance of said capacitor being such that the rate of the voltage rise at the connection between said electron discharge device and said choke coil occurs at a rate not greater than the rate of the voltage rise across said choke coil, whereby to produce a linear output wave form having a maximum potential many times the voltage of said power source.

3. A high voltage sawtooth wave generator comprising an electron discharge device having a control member to control the current flow therethrough, a power source, a load including a choke coil and a resistance connected in series, means connecting said electron discharge device and power source and load in series circuit with said choke coil disposed between said resistance and said electron discharge device, a source of idling potential for said control member sufficient to cause said electron discharge device to conduct heavily through said choke coil when connected thereto, a source of potential for said control member sufficient to interrupt conduction of said electron discharge device when connected thereto, a capacitor connected degeneratively to feed back at least a portion of the potential across said electron discharge device to said control member, the size of said load resistance being such that the gain of the circuit is maximum when said idling potential is applied, a second resistance connected in series between said control member and said sources of potential, the value of said second resistance being low to provide a low impedance discharge path for said feedback capacitor, and means alternately to connect said control member to said source of idling potential to establish a steady state flow of current through said electron discharge device and said choke coil and to establish a substantial field about said choke coil and thereafter to connect said control member to said source of interrupting potential to tend to interrupt the flow of current through said choke coil to cause the collapse of the field associated therewith to generate a linear output sawtooth voltage wave form therefrom at the connection between said electron discharge device and said choke coil, said choke coil having a high inductance such that the idling current-inductance product is sufficiently large that upon application of said source of interrupting potential to said control member a high feedback voltage is developed across said choke coil which increases substantially linearly from a first potential that is only a fraction of the voltage of said power source towards a second potential that is many times the voltage of said power source, the reactance of said choke coil and the capacitance of said capacitor being such that the rate of the voltage rise at the connection between said electron discharge device and said choke coil occurs at a rate not greater than the rate of the voltage rise across said choke coil, whereby to produce an output voltage that is many times the voltage of said power source.

References Cited in the file of this patent

UNITED STATES PATENTS

| | | |
|---|---|---|
| 2,244,003 | Eaglesfield | June 3, 1941 |
| 2,501,857 | Stewart | Mar. 28, 1950 |
| 2,562,305 | Ellsworth et al. | July 31, 1951 |
| 2,594,104 | Washburn | Apr. 22, 1952 |
| 2,662,197 | Comte | Dec. 8, 1953 |
| 2,692,334 | Blumlein | Oct. 19, 1954 |
| 2,838,752 | Philpott | June 10, 1958 |

FOREIGN PATENTS

| | | |
|---|---|---|
| 631,359 | Great Britain | Nov. 1, 1949 |
| 639,531 | Great Britain | June 28, 1950 |
| 711,170 | Great Britain | June 23, 1954 |
| 736,295 | Great Britain | Sept. 7, 1955 |